Sept. 2, 1952        F. A. TERHUNE        2,609,085
CONVEYER DRIVE CONTROL

Filed Aug. 7, 1948        2 SHEETS—SHEET 1

Inventor
Frank A. Terhune
By
Spencer Willets, Helwig & Baillio
Attorneys

Sept. 2, 1952   F. A. TERHUNE   2,609,085
CONVEYER DRIVE CONTROL
Filed Aug. 7, 1948   2 SHEETS—SHEET 2

Inventor
Frank A. Terhune
By
Spencer Willits, Helmig Baillio
Attorneys

Patented Sept. 2, 1952

2,609,085

UNITED STATES PATENT OFFICE 2,609,085

CONVEYER DRIVE CONTROL

Frank A. Terhune, Natick, Mass., assignor to General Motors Corporation, Detroit, Mich., a corporation of Delaware Application August 7, 1948, Serial No. 43,081

9 Claims. (Cl. 198—203)

This invention relates to conveyors, for example chain conveyors, and particularly to means for controlling and synchronizing conveyor drive units to the end that conveyor break-downs and the damage resulting therefrom will be eliminated or at least substantially reduced.

Although applicable in its broadest sense to conveyors driven by a single drive unit, the invention is chiefly concerned with controlling a plurality of drive units located at spaced points along a conveyor line in a manner which will keep them synchronized and prevent excessive slack occurring in the conveyor line between any two drive units. Associated with each drive unit is a control device for stopping the operation thereof and actuatable by a member movably responsive to the development of slack in the conveyor line between that drive unit and the drive unit ahead.

The principal object of the invention is to provide means responsive to the occurrence of excessive slack in a conveyor line between successive drive units thereon for synchronizing said drive units and thereby controlling the development of said slack.

Another object of the invention is to provide means for automatically stopping one of a plurality of conveyor drive units when excessive slack develops in the conveyor line between that and an adjacent drive unit, but which upon said slack being taken up will allow said first mentioned drive unit to resume operation.

Another object of the invention is to provide a control system for synchronizing a plurality of drive units associated with a conveyor line, such that when excessive slack develops in the line between any two drive units thereon the rearmost unit will cease operation while said excessive slack condition exists and a signal indicating the same will commence functioning and will continue to function after said slack has been taken up and said rearmost drive unit resumes operation.

The manner by which these and other objects are attained by the invention will be readily apparent from the following description taken in connection with the drawings illustrating a preferred structural embodiment thereof, and in which.

Figure 1:
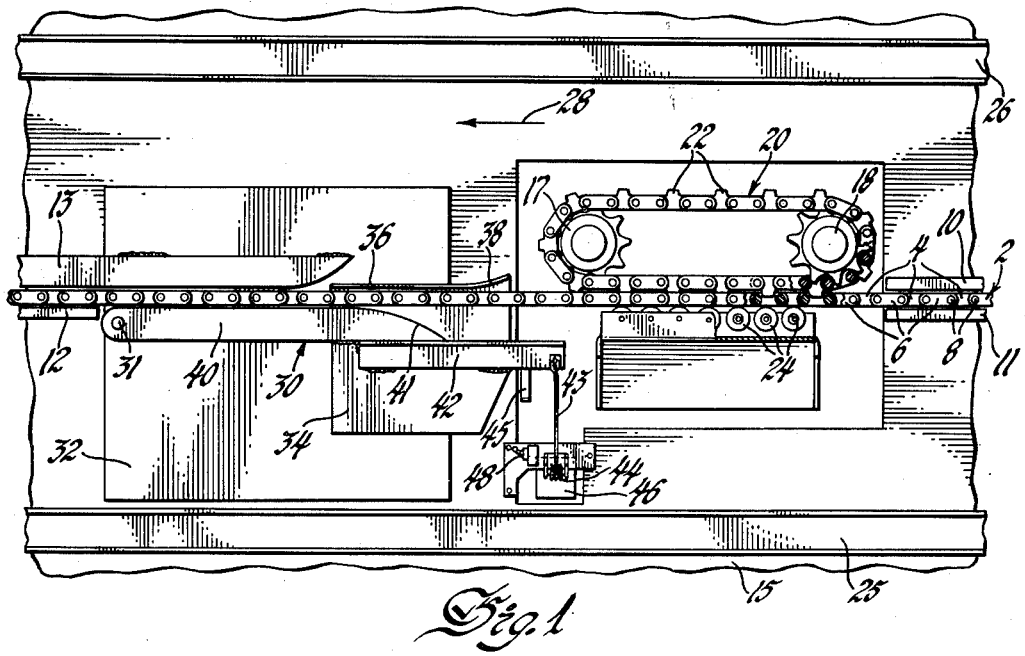
Figure 1 is a plan view of a portion of a conveyor line and one of its driving units, with an attachment forming part of my invention installed thereon and shown in its normal position.
Figure 2:
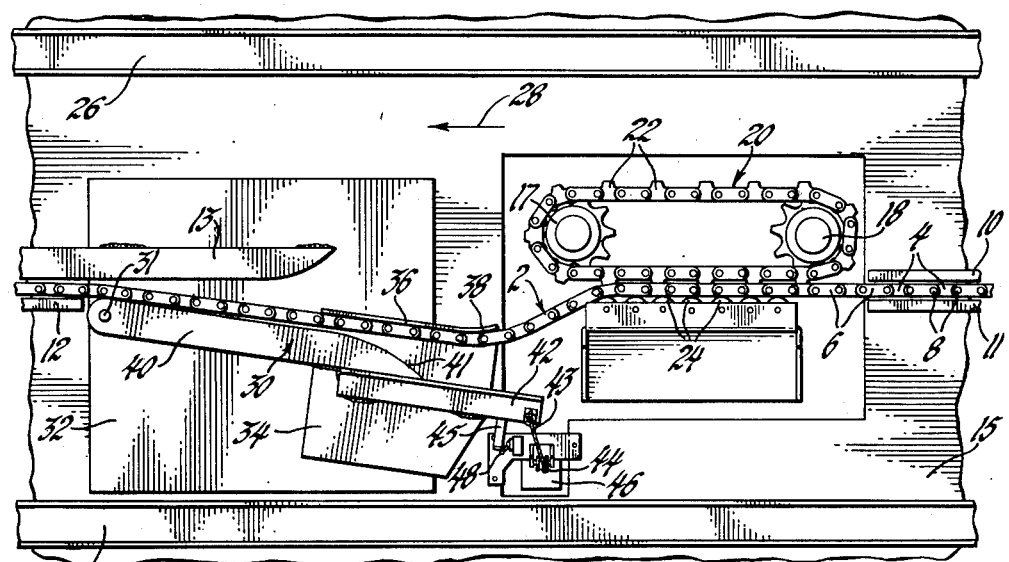
Figure 2 is a view similar to Figure 1, but showing the changed positions taken by certain elements of my attachment upon the occurrence of excessive slack in the conveyor line.
Figure 3:
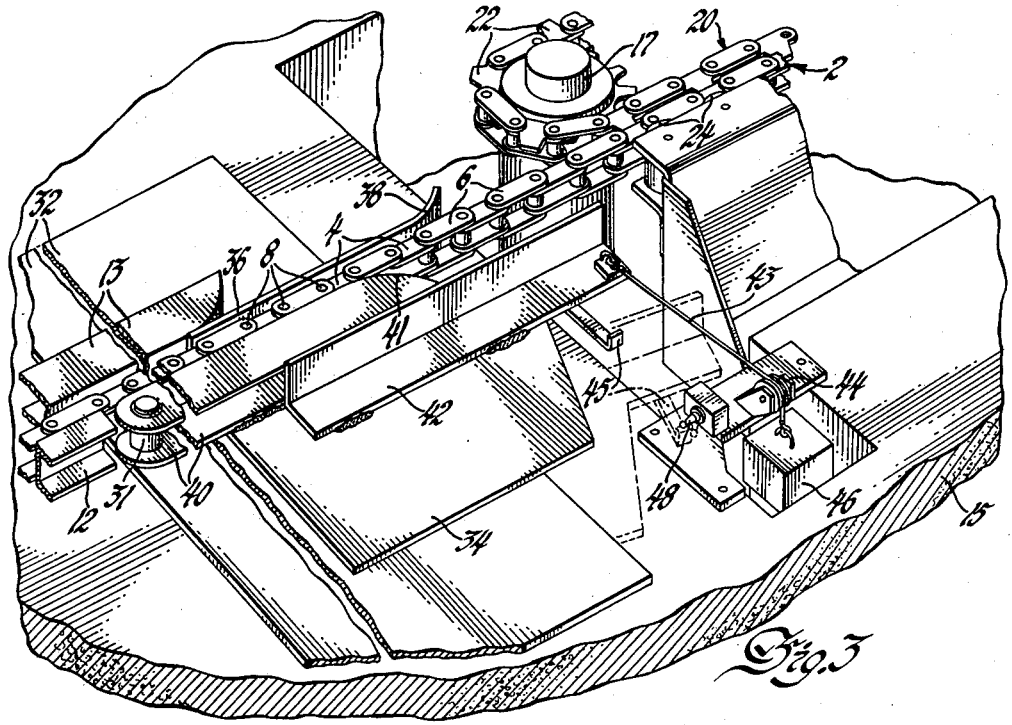
Figure 3 is an enlarged fragmentary view in perspective showing in solid lines the relationship of the conveyor line, drive unit and my attachment in the same respective positions as seen in Figure 1, and indicating in broken lines portions of certain elements of the attachment in their positions as seen in Figure 2.

Shown in Figures 1 to 3 of the drawings is a conveyor line 2 of conventional chain design, consisting of links 4 and couplings 6 pivotally joined together by vertical pins 8, and slidably supported in stationary raceways formed by oppositely spaced outwardly open channel members 10, 11 and 12, 13 resting on a supporting base 15. The conveyor line 2 forms a continuous loop and is driven at spaced stations therealong by driving motors or other power means (not shown) geared to sprocket wheels 17, 18, around which extends a conveyor drive chain 20 which may be similar in construction to the conveyor line 2 except provided with outwardly extending lugs 22 adapted to engage the conveyor line by projecting between the couplings 6 thereof. Opposite the conveyor drive chain 20 the line 2 passes over rollers 24 mounted on vertical axes which guide it into engagement with the lugs 22. Fixed to the base 15 on each side of the conveyor line 2 and extending parallel therewith are upwardly open channel sections 25, 26 which serve as castor tracks for the conveyor trucks (not shown).

In the arrangement shown the conveyor line 2 travels in the direction of the arrow 28. As distinguished from the usual construction wherein the conveyor line re-enters a raceway immediately upon leaving the drive chain 20, the invention contemplates providing a gap in the raceway at this point and inserting therein an attachment comprising a movable raceway indicated generally by the numeral 30 which is pivoted about a pin 31 and slidably supported on a wear plate 32 fixed to the base 15. The movable raceway may, as shown, be conveniently constructed of a plate 34 having an up-turned edge 36 one end 38 of which is flared outwardly as shown to form an entering guide for one side of the conveyor line 2, and an outwardly open channel section 40 welded thereto and having its end 41 flared outwardly in the opposite direction to form an entering guide for the other side of the conveyor line. Also fixedly attached to the plate 34 as by welding, and extending preferably parallel with the normal direction of movement of the conveyor line, is an arm 42 to which is attached one end of a flexible member such as the cable 43 extending transversely therefrom and running over a sheave or pulley 44 supported by the base 15. The other end of the cable is attached to a biasing means such as the weight 46 which is continuously suspended therefrom and tends to rotate the movable raceway 30 about its pivot pin 31 from the position shown in Figure 1 to that shown in Figure 2. Fixedly attached to the arm 42 for movement with the movable raceway 30 is a trip member or dog 45 adapted to engage the actuating lever of a normally closed electrical switch 48 fixedly mounted on the base 15.

It will be noted that the stationary channel section 13 extends a substantial distance closer to the drive chain 20 than the adjacent end of its cooperating stationary channel section 12, and that the movable channel section 40 extends approximately the same distance in the opposite direction beyond the movable plate 34 to the pivot pin 31. Also, the movable plate 34 with its upturned edge 36 extends substantially closer to the drive chain 20 than does the movable channel section 40. With this arrangement the stationary channel section 13 serves as a stop for the movable raceway 30 as it returns from its position shown in Figure 2 to its position shown in Figure 1. In addition, by reason of the conveyor line 2 being laterally unrestrained over a substantially longer distance on the side nearest the castor track 25 than on the opposite side, as slack develops in the line 2 after leaving the drive chain 20 it will tend to bow or buckle in that rather than in the opposite direction. The weight 46 is chosen of sufficient magnitude to overcome the sliding friction between the movable plate 34 and the stationary wear plate 32, and to maintain the plate 34 in contact with the conveyor line 2 as the latter buckles with excessive slack. In addition, as tension decreases in the conveyor line 2 toward a slack condition, the weight 46 will tend to assist the buckling of the line 2 in the direction toward the castor track 25.

As is apparent from the description heretofore given, with the conveyor line 2 in normal operation, the movable raceway 30 is held thereby in the position shown in Figure 1. Upon the occurrence of excessive slack developing in the conveyor line 2 between its leaving the drive chain 20 and its entrance into the stationary raceway provided by the stationary channel sections 12 and 13, due either to a break occurring in the line 2, a failure of the drive unit ahead, or the line 2 jumping out of its raceway at a turn, etc. the weight 46 will tend to cause the movable raceway 30 to pivot to the position shown in Figure 2, during which movement the trip dog 45 will actuate the switch 48 to open position.

Figure 1A:
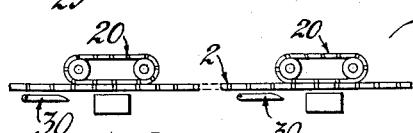
Figure 1a is a partly diagrammatic view similar to Figure 1 showing the arrangement of the conveyor line with two driving units in spaced relation therealong, each of which has associated with it an attachment in accordance with my invention.
Figure 4:
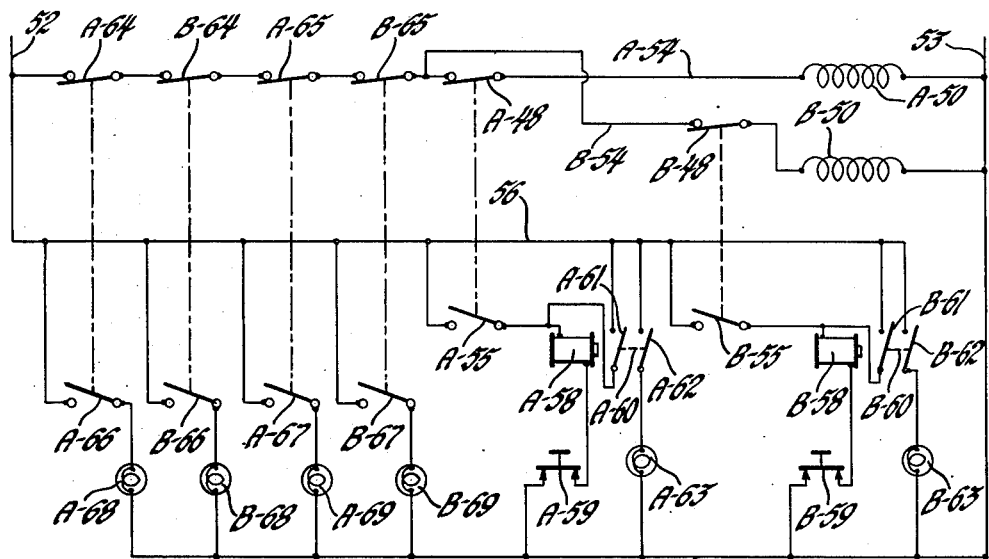
Figure 4 is a circuit diagram showing a preferred arrangement of the electrical apparatus employed for carrying out my invention on a conveyor line having two drive units.

It is contemplated that an attachment will be employed in the manner described adjacent each driving unit, as indicated in Figure 1a. In Figure 4 is shown a diagram of the electrical control circuit for a conveyor line driven by two drive units, the circuit elements associated respectively therewith being designated with numerals prefixed by "A" and "B." The electric motors or other means for operating the drive units are controlled by magnetic contactors or relay switches, the windings A-50 and B-50 of which are shown. Current is supplied from a suitable source through leads 52 and 53, between which under normal operating conditions current flows through two parallel circuits A-54 and B-54 which include respectively the windings A-50 in series with the normally closed slack responsive switch A-48 and the winding B-50 in series with the normally closed slack responsive switch B-48. Linked to close upon opening of the normally closed slack responsive switches A-48 and B-48 respectively are normally open switches A-55 and B-55 in parallel between a common conductor 56 connected to the lead 52 and a common conductor 57 connected to the lead 53. In series with the normally open switch A-55 and between it and the common conductor 57 are a relay coil A-58 and a normally closed manually actuatable resetting switch A-59. Similarly, between the normally open switch B-55 and the common conductor 57 are a relay coil B-58 and a normally closed manually actuatable resetting switch B-59. Biased to its open position as shown and closable upon energization of the relay coil A-58 is a double-armed switch A-60, the arms A-61 and A-62 of which are adapted when moved to their closed positions to complete a holding circuit for the relay coil A-58 between the common conductors 56 and 57, and to complete an energizing circuit between the same conductors for a signal device such as the pilot lamp A-63. Similarly associated with the relay coil B-58 is a pilot lamp B-63 and a double-armed switch B-60 having arms B-61 and B-62. There are also preferably provided normally closed manually actuatable start-stop switches A-64, B-64 and normally closed over-load actuated switches A-65, B-65 for the two drive units, all four of such switches being in series with both the normally closed parallel circuits A-54 and B-54. Linked to close upon opening of the switches A-64, B-64, A-65, B-65 respectively are normally open switches A-66, B-66, A-67, B-67, which are adapted in their closed positions to complete energizing circuits for the pilot lamps A-68, B-68, A-69, B-69 between the common conductors 56 and 57.

In operation, in event successive slack develops in the section of the conveyor line moving from drive unit A to an adjacent drive unit B (the latter being considered the more forwardly in the direction of motion of the conveyor line), the normally closed slack responsive switch A-48 will open, which will cause the winding A-50 to de-energize, stopping the drive unit A. Also, the opening of switch A-48 effects a simultaneous closing of the normally open switch A-55 linked thereto, and an energization of the relay coil A-58 which causes the normally open double-armed switch A-60 to close, holding the relay coil A-58 and pilot lamp A-63 energized. Should the excess slack in that section of the conveyor line be subsequently taken up, as for example by the continued operation of drive unit B, the slack responsive switch A-48 will return to its normally closed position, re-energizing the winding A-50 to restart drive unit A. As a signal to identify the section of the conveyor line wherein the excessive slack condition had developed, however, the pilot lamp A-63 will continue to glow until the circuit through the relay coil A-58 is broken by manually opening the normally closed resetting switch A-59.

Similarly, in the event excessive slack develops in the section of the conveyor line between the drive unit B and the next drive unit ahead (A, in a two-drive-unit conveyor system), the normally closed slack responsive switch B-48 opens, stopping drive unit B while the next drive unit ahead continues to operate, and lighting pilot lamp B-63.

Actuation of any one of the manual or overload switches A-64, B-64, A-65, B-65 from their normally closed positions causes both drive units A and B to stop and the particular pilot lamp A-68, B-68, A-69 or B-69 associated with such switch to light up.

I claim:

1. In a conveyor system, a continuous conveyor line driven by a plurality of spaced and separately controllable driving units, a movable raceway adjacent each drive unit comprising two longitudinally staggered relatively fixed members embracing the conveyor line, a stationary raceway for guiding the conveyor line between the movable raceways and the driving units, each of the stationary raceways comprising oppositely disposed parallel guide members having their ends adjacent the movable raceway members in staggered complementary relation therewith, each of the movable raceways being pivotable about the end thereof most remote from its adjacent driving unit in response to excessive slack occurring in the section of the conveyor line embraced thereby, switch means for controlling each drive unit independently and actuatable by pivotal movement of the movable raceway adjacent thereto.

2. In a conveyor system, a conveyor line driven by a plurality of spaced and separately controllable drive units, stationary raceways between successive drive units comprising cooperating parallel guide members embracing the conveyor line, one of the guide members of each stationary raceway having one of its ends more remote from the adjacent drive unit than the corresponding end of its cooperating guide member, a movable raceway between the said ends of each stationary raceway and the adjacent drive unit, each of the movable raceways comprising two relatively fixed parallel members embracing the conveyor line in normally substantial continuity with the guide members of stationary raceway adjacent thereto, each of the movable raceways being pivotable about a point adjacent the end of the more remote ended guide member of the stationary raceway adjacent thereto in response to slack occurring in the conveyor line between the drive unit adjacent thereto and the next drive unit ahead, control devices for controlling the operation of each drive unit independently, said control devices being mounted adjacent their respective drive units and adapted to be actuated by the movable raceways in pivoting from their normal positions.

3. In a conveyor system; a conveyor line having flexibility in one principal plane; a plurality of conveyor driving units engaging the conveyor line at spaced stations therealong; raceways embracing the conveyor line between successive driving units, each including a portion movable in said principal plane of flexibility in response to excessive slack occurring in the conveyor line; relay switches for independently controlling the operation of the respective drive units; electrical circuits for energizing the relays and thereby maintaining the respective drive units in operation; normally closed switches in each of said circuits in series with the relay therein, said normally closed switches being actuatable to open position by the movable portions of the raceways.

4. In a conveyor system, a continuous conveyor chain having a plurality of driving chains engaging the same at spaced stations therealong, stationary raceways for guiding the conveyor chain between successive stations, a chain guided raceway between one end of each stationary raceway and the driving chain adjacent thereto, each of the chain guided raceways being pivotable about one of its ends to a position angularly disposed with respect to its adjacent stationary raceway, means for biasing each chain guided raceway to its angularly disposed position in response to slack occurring in the conveyor chain between the driving chains nearest each end thereof, and devices responsive to pivotal movements of each respective chain guided raceway for controlling the operation of the driving chain adjacent thereto.

5. In a conveyor system a continuous conveyor line driven by driving members spacedly disposed therealong, stationary raceways for guiding the conveyor line between successive driving members, each of the stationary raceways comprising two parallel guide members embracing the conveyor line and terminating at staggered distances from the driving member adjacent one end thereof, a movable raceway between the staggered ends of each stationary raceway and the driving unit adjacent thereto and comprising generally parallel relatively fixed members embracing the conveyor line, one of said members of each movable raceway being adapted in its normal position to effect a continuation of the guide member terminating nearest the adjacent driving member, the other of said members of each movable raceway being pivoted at its end most remote from the driving member adjacent thereto for free swinging movement away from the guide member terminating nearest said driving member in response to excessive slack conditions occurring in the conveyor line, and a switch opposite the swinging end of each movable raceway and operable upon outward movement thereof to stop the driving member adjacent thereto.

6. A control system for a conveyor line driven by a plurality of drive units, comprising relay switches controlling the operation of each drive unit independently, a current source for energizing the windings of said relay switches, parallel circuits for connecting said windings to the current source and including normally closed switches in series therewith, members disposed respectively between each pair of successive drive units and movable relative thereto in response to the degree of slack occurring in the conveyor line therebetween, extreme movement of each said member during increasing slack being effective to open the switch in the circuit of the winding of the relay switch controlling the drive unit rearwardly adjacent said member, normally open switches closable respectively upon opening of said normally closed switches, other relay switches closable respectively in response to closing said normally open switches and provided with holding circuits operative to maintain them in closed positions after their initial closure, signal means associated with each drive unit and operatively subject to the closing of said last named relay switches.

7. In a conveyor system, a conveyor line having a plurality of driving members engaging the same at spaced stations therealong, stationary raceways for guiding the line between successive stations, a line guided raceway normally positioned between one end of each stationary raceway and the station adjacent thereto, said stationary and guided raceways having complementary adjacent end portions embracing the conveyor line each of the line guided raceways being movable from its normal position in response to slack occurring in the line between the driving members nearest each end thereof, and devices responsive to the movements of each respective line guided raceway for controlling the operation of the driving unit adjacent thereto.

8. In combination with a conveyor line driven by a plurality of separately controllable driving units at spaced stations therealong, a raceway for the conveyor line between each pair of successive driving units including a portion movable in response to slack developing in the conveyor line, said raceway and its movable portion having their adjacent ends in complementary embracing relation with the conveyor line, and devices responsive to movements of said portions for controlling the operation of the respective driving units.

9. A control system for a conveyor line driven by a plurality of drive units, comprising relay switches controlling the operation of the respective drive units independently, a current source for energizing the windings of said relay switches, parallel circuits connecting said windings to the current source, each said circuit including a normally closed switch in series with its relay winding arranged to open in response to excessive slack occurring in the conveyor line between the drive unit associated therewith and the next drive unit ahead, normally open switches closable respectively upon opening of said normally closed switches, other relay switches closable respectively in response to closing said normally open switches and provided with holding circuits operative to maintain them in closed positions after their initial closure, signal means associated with each drive unit and operatively subject to the closing of said last named relay switches.

FRANK A. TERHUNE.

REFERENCES CITED

The following references are of record in the file of this patent:

UNITED STATES PATENTS

| Number | Name | Date |
|---|---|---|
| 1,370,029 | Macdermid | Mar. 1, 1921 |
| 1,620,532 | Fisher | Mar. 8, 1927 |
| 2,472,526 | Frazee | June 7, 1947 |